Sept. 15, 1959 C. M. NICHOLS 2,903,866
UNIVERSAL JOINT
Filed Sept. 9, 1957 2 Sheets-Sheet 1
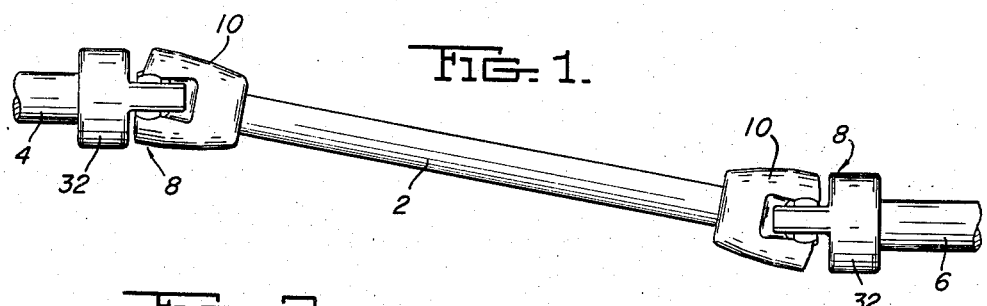
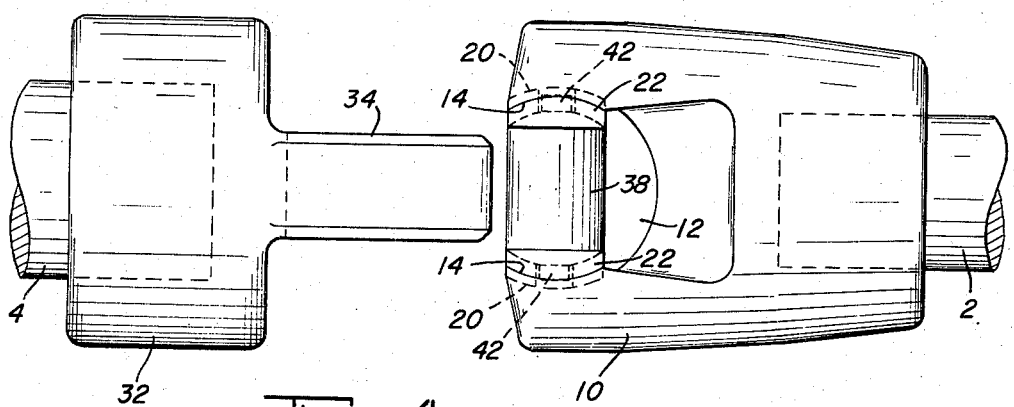
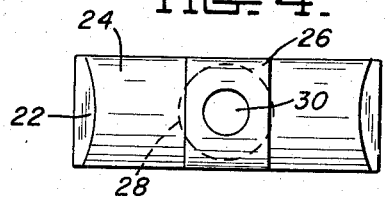
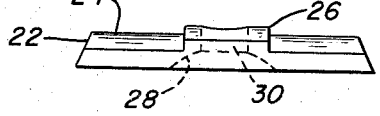
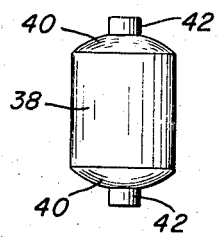
INVENTOR
CHARLES M. NICHOLS
By: Robert U. Geib, Jr.
Attorney Sept. 15, 1959  C. M. NICHOLS  2,903,866
UNIVERSAL JOINT
Filed Sept. 9, 1957  2 Sheets-Sheet 2
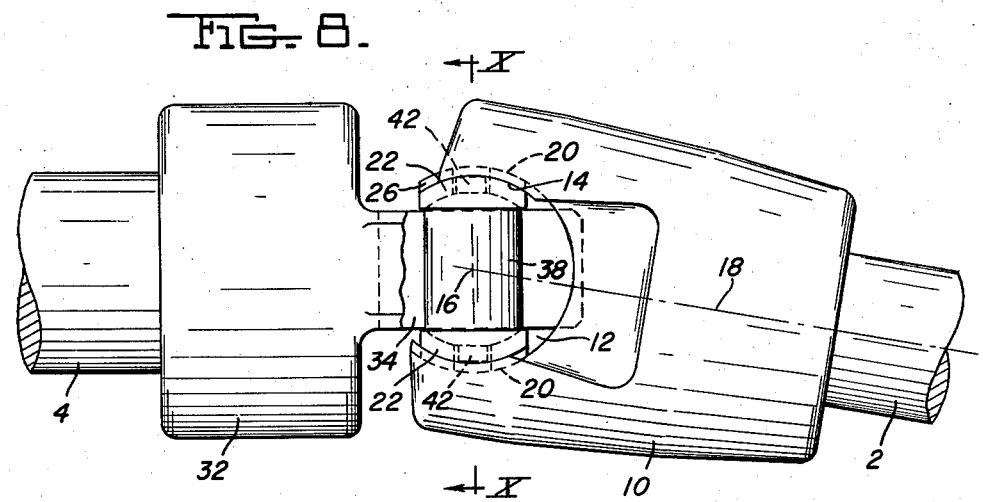
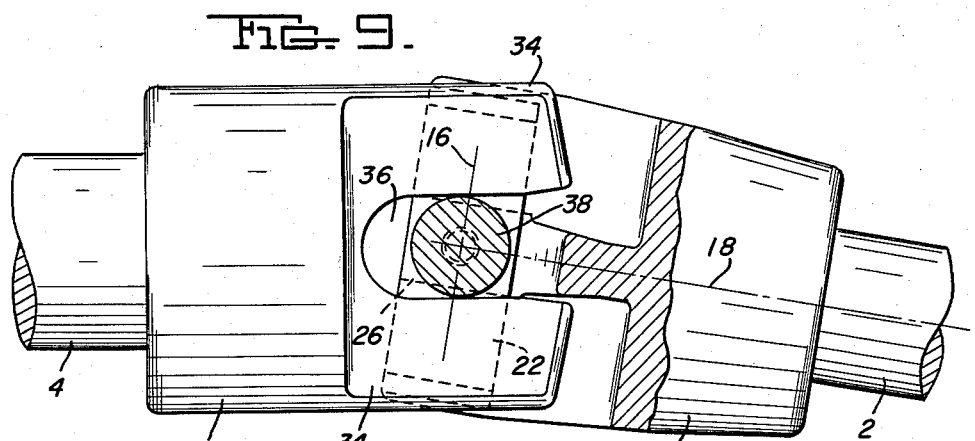
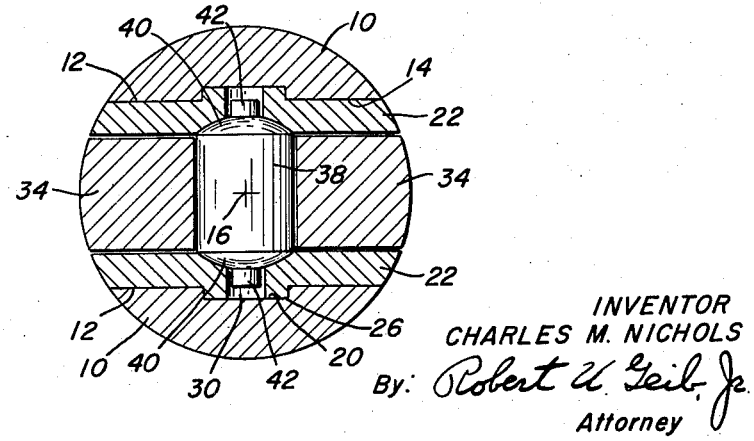
INVENTOR
CHARLES M. NICHOLS
By: Robert U. Geib, Jr.
Attorney United States Patent Office 2,903,866
Patented Sept. 15, 1959

2,903,866
UNIVERSAL JOINT
Charles M. Nichols, Pittsburgh, Pa.
Application September 9, 1957, Serial No. 682,771
3 Claims. (Cl. 64—7)

This invention relates to a universal joint and more particularly to the type of joint having two cylindrical concave surfaces on a female member and a pin through a male member extending into two slippers one in contact with each of the cylindrical surfaces. One such joint is shown in Shakely Patent No. 1,839,602. In the joints of which I have knowledge the pin extends into the slippers so that they must rotate as a unit. The axes of the male and female members are at an angle to one another and in two positions 180° apart the point of intersection of the axes is on the axis of the pin. At the positions midway between these two positions the point of intersection lies on the axis of the cylindrical surfaces. Thus, as the male and female members make one revolution there are four points where the hinging action between them is perfect and no pinching action occurs. At all other points the hinging action is the resultant of the action around the axis of the pin and the axis of the cylindrical surfaces and the slippers. Because the pin must rotate with the slippers the pin oscillates every time the male and female members rotate between each two of the four points of perfect hinging. Thus, there are four oscillations per revolution. These oscillations cause end thrust on the driving and/or driven parts of the assembly. During each half revolution the slippers must move from one side of a plane perpendicular to the axis of the male and female members at their point of intersection to the opposite side of that plane. This causes wear on the slippers and also uses up an additional amount of power due to the friction developed by imperfect hinging.

It is therefore an object of my invention to provide a universal joint wherein there is no oscillation of a pin during rotation of the parts.

Another object is to provide such a universal joint wherein longitudinal movement of the slippers is eliminated.

A further object is to provide such a universal joint wherein the slippers can move independently of the pin.

Still another object is to provide a universal joint wherein there is substantially perfect hinging between the male and female members at all times.

These and other objects will be more apparent after referring to the following specification and attached drawings, in which:

Figure 1 is an elevation showing the universal joint of my invention in a shaft assembly;

Figure 2 is an enlarged elevation of the male member of my universal joint;

Figure 3 is an enlarged elevation of the female member of the universal joint;

Figure 4 is a plan view of the slipper used in the universal joint;

Figure 5 is a side elevation of the slipper of Figure 4;

Figure 6 is an end elevation of the slipper of Figure 4;

Figure 7 is a view of the pin used in the universal joint;

Figure 8 is an assembly view of the universal joint;

Figure 9 is a view, partly in section, showing the joint rotated 90° from the position in Figure 8; and Figure 10 is a view taken on the line X—X of Figure 8 but showing the parts as if the male and female members were in axial alignment.

Referring more particularly to the drawings, the reference numeral 2 indicates a shaft extending between two shafts 4 and 6. All the shafts are rotatable and either shaft 4 or 6, while adjustably mounted, is not normally moved axially or transversely while transmitting power. The ends of shafts 2 and 4 and the ends of shafts 2 and 6 are connected by means of universal joints 8 of my invention. Female member 10 of the joint 8 is secured to the ends of shaft 2 in any suitable manner. The member 10 has a transverse opening 12 therein which has two concave cylindrical surfaces 14 with a common axis 16 perpendicular to axis 18 of member 10. A recess 20 is provided on each surface 14 intermediate its ends. The bottom of the recess 20 is preferably cylindrical with its axis on line 16. A pair of slippers 22 are received in the opening 12 in spaced apart relationship as shown. Each slipper 22 has a cylindrical outer surface 24 and a projection 26 intermediate its ends. The radius of surface 24 is the same as that of surface 14 except that a slight clearance is provided. The surface of projection 26 is also preferably cylindrical over at least part of its length to match the bottom surface of recess 20. Each of the slippers 22 has a spherical concave surface 28 on the inside thereof and a hole 30 extending from the surface 28 to the outside of projection 26. A male member 32 is mounted on each of the shafts 4 and 6 in any suitable manner. The end of member 32 has flattended bifurcations 34 with an opening 36 therebetween. A pin 38 is received in the opening 36 and has spherical ends 40 which are an operative part of the male member. The center of the spherical surfaces 40 is on the point of intersection of the axes of the shafts 2 and 4 and its radius is equal to the radius of spherical surface 28 except for provision of a slight clearance. A projection 42 is provided on each spherical end 40 and extends into opening 30. The diameter of projection 42 is sufficiently smaller than opening 30 that it will not engage the walls thereof. If feasible the pin 38 could be made integral with the member 32 and the projections 42 omitted, these being provided merely for the purpose of preventing the pin from dropping out when the joint is being assembled. The purpose of the projections 26 is to prevent movement of the slippers 22 transversely when the mechanism is stopped.

While one embodiment of my invention has been shown and described it will be apparent that other adaptations and modifications may be made without departing from the scope of the following claims.

I claim:

1. A universal joint comprising a male member, a female member having an opening therein for receiving said male member with space therebetween, said male member having two spherical surfaces associated therewith one on each side extending into said space, said female member having a transverse concave cylindrical surface on said opening with its axis in said opening, a slipper in the space between each of said cylindrical surfaces and said male member, each slipper having a cylindrical surface in engagement with the associated cylindrical surface in said opening and a spherical surface in engagement with the spherical surface on said male member, the center of said spherical surfaces being approximately on the point of intersection of the axes of said male and female members and the axes of said cylindrical surfaces extending transversely of said male and female members approximately through the center of said spherical surfaces.

2. A universal joint comprising two rotatable shafts, the first of said shafts having an opening therein, an extension on the second of said shafts extending into said opening, said opening having spaced cylindrical surfaces with their axes in said opening and extending transversely of said first shaft, said second shaft having a transverse opening therein, a pin extending through said second named opening, said pin having a spherical portion at each end extending from said second named opening, a slipper in the space between each of said spherical portions and each cylindrical surface, each slipper having a cylindrical surface in engagement with the associated cylindrical surface of said opening and a spherical surface in engagement with the associated spherical surface on said pin, the center of said spherical surfaces being approximately on the point of intersection of the axes of said shafts and the axes of said cylindrical surfaces extending transversely of said shafts approximately through the center of said spherical surfaces.

3. A universal joint comprising two rotatable shafts, the first of said shafts having an opening therein, an extension on the second of said shafts extending into said opening, said opening having spaced cylindrical surfaces with their axes in said opening and extending transversely of said first shaft, said second shaft having a transverse opening therein, a pin extending through said second named opening, said pin having a spherical portion at each end extending from said second named opening, a slipper in the space between each of said spherical portions and each cylindrical surface, each slipper having a cylindrical surface in engagement with the associated cylindrical surface of said opening and a spherical surface in engagement with the associated spherical surface on said pin, each of said slippers having an opening therein aligned with said pin, means for preventing longitudinal movement of said slippers, and an extension on each end of said pin extending into said last named opening but out of engagement with the walls thereof.

References Cited in the file of this patent
UNITED STATES PATENTS

| | | |
|---|---|---|
| 1,839,602 | Shakely | Jan. 5, 1932 |
| 2,117,706 | Cutting | May 17, 1938 |
| 2,153,093 | Magee et al. | Apr. 14, 1939 |
| 2,305,595 | Backus | Dec. 22, 1942 |